(12) United States Patent
Silbernagl et al.

(10) Patent No.: US 7,566,003 B2
(45) Date of Patent: *Jul. 28, 2009

(54) LEARNING FARE COLLECTION SYSTEM FOR MASS TRANSIT

(75) Inventors: Martin Friedrich Ludwig Silbernagl, Brooklyn, NY (US); Nathaniel Polish, New York, NY (US)

(73) Assignee: Specialty Acquirer LLC

( * ) Notice: Subject to any disclaimer, the term of this patent is extended or adjusted under 35 U.S.C. 154(b) by 0 days.

This patent is subject to a terminal disclaimer.

(21) Appl. No.: 11/838,499

(22) Filed: Aug. 14, 2007

(65) Prior Publication Data

US 2008/0135612 A1    Jun. 12, 2008

Related U.S. Application Data

(63) Continuation-in-part of application No. 11/668,456, filed on Jan. 29, 2007.

(60) Provisional application No. 60/869,112, filed on Dec. 7, 2006.

(51) Int. Cl.
*G06K 5/00* (2006.01)
*G06K 7/01* (2006.01)
*G07B 15/00* (2006.01)
*G07B 15/02* (2006.01)

(52) U.S. Cl. .................. 235/382; 235/375; 235/380; 235/382.5; 235/384; 705/13; 705/14

(58) Field of Classification Search .............. 235/382, 235/384, 375, 380, 382.5; 705/13, 14
See application file for complete search history.

(56) References Cited

U.S. PATENT DOCUMENTS

| 3,438,489 | A | 4/1969 | Cambornac et al. |
| 4,654,658 | A | 3/1987 | Walton |
| 4,899,036 | A | 2/1990 | McCrindle et al. |
| 5,053,774 | A | 10/1991 | Schuermann et al. |
| 5,103,079 | A | 4/1992 | Barakai et al. |
| 5,191,193 | A | 3/1993 | Le Roux |
| 5,286,955 | A | 2/1994 | Klosa |
| 5,337,063 | A | 8/1994 | Takahira |
| 5,396,558 | A | 3/1995 | Ishiguro et al. |
| 5,449,894 | A | 9/1995 | Bruhnke et al. |
| 5,479,172 | A | 12/1995 | Smith et al. |
| 5,504,321 | A | 4/1996 | Sheldon |
| 5,828,044 | A | 10/1998 | Jun et al. |
| 6,394,341 | B1 * | 5/2002 | Makipaa et al. ............. 235/379 |

(Continued)

FOREIGN PATENT DOCUMENTS

EP          0 254 595 B1     5/1994

(Continued)

OTHER PUBLICATIONS

Andara, Lael D., Ropers, Majeski, Kohn & Bentley, "Request for Ex Parte Reexamination of U.S. Patent No. 5,828,044", dated Aug. 23, 2007, 23 pages, Redwood City, California.

(Continued)

*Primary Examiner*—Thien M. Le
*Assistant Examiner*—Tuyen K Vo (57) ABSTRACT

An implementation of a system and method for regulating entry in a transit system using information from a bankcard, such as a credit card or debit card is provided.

68 Claims, 6 Drawing Sheets

U.S. PATENT DOCUMENTS

| | | | |
|---|---|---|---|
| 6,480,101 | B1 | 11/2002 | Kelly et al. |
| 6,732,922 | B2 | 5/2004 | Lindgren et al. |
| 2002/0161729 | A1* | 10/2002 | Andrews .................... 705/417 |
| 2002/0174013 | A1* | 11/2002 | Freeman et al. ............... 705/14 |
| 2003/0088777 | A1 | 5/2003 | Bae et al. |
| 2005/0216405 | A1 | 9/2005 | So |
| 2006/0278704 | A1* | 12/2006 | Saunders et al. ............ 235/382 |
| 2008/0033880 | A1 | 2/2008 | Fiebiger et al. |
| 2008/0156873 | A1 | 7/2008 | Wilhelm et al. |

FOREIGN PATENT DOCUMENTS

| | | |
|---|---|---|
| GB | 2 267 626 A | 12/1993 |
| WO | WO 94/22115 A1 | 9/1994 |
| WO | WO 97/00501 A1 | 1/1997 |
| WO | WO 2006/124808 A2 | 11/2006 |
| WO | WO 2007/090027 A2 | 8/2007 |

OTHER PUBLICATIONS

Andara, Lael D., Ropers, Majeski, Kohn & Bentley, "Exhibit D—Invalidity Claim Chart for U.S. Patent No. 5,828,044", not dated, 17 pages, Redwood City, California.

Bistrich, Austrian Patent Office, International Search Report for International Application No. PCT/KR96/00061, dated Jul. 29, 1996, 6 pages, Vienna, Austria.

"Hashing Credit Card Numbers" by Integrigy, Feb. 27, 2007 (16 pages).

"Hash function" by Wikipedia, downloaded from http://en.wikipedia.org/wiki/Hash_function on May 21, 2009 (9 pages).

"Payment Card Industry (PCI) Data Security Standard (DSS) and Payment Application Data Security Standard (PA-DSS) Glossary", Ver. 1.2, Oct. 2008 [see p. 6 "Hashing"](14 pages).

"Query data faster using sorted hash clusters" by Scott Stephens, Jul. 27, 2005, downloaded May 21, 2009 (1 page).

"Skiers new can pay for bus ride with a 'blink'" by Nicole Warburton of Deseret Morning News, Dec. 7, 2006 (2 pages).

"ISO/IEC 4909: Identification cards—Financial transaction cards—Magnetic stripe data content for track 3", First edition, Jul. 1, 2006 (21 pages).

"ISO/IEC 7812-1: Identification cards—Identification of issuers—Part 1: Numbering system", Second edition, Sep. 15, 2000 (11 pages).

"ISO/IEC 7813: Information technology—Identification cards—Financial transaction cards", Sixth edition, Jul. 1, 2006 (12 pages).

"ISO/IEC 7816-4: Identification cards—Integrated circuit cards—Part 4: Organization, security and commands for interchange", Second edition, Jan. 15, 2005 (90 pages).

"ISO/IEC 7816-5: Identification cards—Integrated circuit cards—Part 5: Registration of application providers", Second edition, Dec. 1, 2004 (13 pages).

"ISO/IEC 7816-6: Identification cards—Integrated circuit cards—Part 6: Interindustry data elements for interchange" Second edition May 15, 2004 (26 pages).

* cited by examiner

LEARNING FARE COLLECTION SYSTEM FOR MASS TRANSIT

CROSS-REFERENCE TO RELATED APPLICATIONS

This application is a continuation-in-part of and claims the benefit under 35 U.S.C. 120 from prior application Ser. No. 11/668,456, filed Jan. 29, 2007, which is incorporated herein by reference. This application also claims the benefit under 35 U.S.C. 119(e) from U.S. Provisional Application No. 60/869,112, filed Dec. 7, 2006, which is incorporated herein by reference.

BACKGROUND OF THE INVENTION

1. Field of the Invention

The invention relates generally to transit system access and more specifically to regulating entry in a transit system using information from a bankcard, such as a credit card or debit card.

2. Background of the Invention

In cases where a commodity or a service is to be purchased from a merchant using a bankcard and a conventional card inquiry system, the card is inserted into a card reader, so that the magnetic stripe of the card passes through and in contact with the card reader. The card number and other data contained on the magnetic stripe's tracks are read by the card reader. The card reader transmits data, including transaction amount, through an electric line (traditionally a telephone line) to the merchant's acquirer (also called merchant bank). The acquirer is in turn connected to clearing and settlement networks through which the transaction is checked with regard to card validity and funds availability. The network then transmits an approval number or a disapproval number through the merchant's acquirer to the card reader.

However, the above described conventional card inquiry system takes at best several seconds to complete, because the transaction has to pass through several networks before reaching an authoritative entity (usually the card's issuing bank). Such a consumption of time in the conventional system has been a serious impediment in broadening markets of credit card utilization. Even if the communication speed could be accelerated, access to a telecommunication network is not available in all places where payments are made.

Therefore, a need exists to decrease an average latency when approving access to a high volume system such as a mass transit system.

SUMMARY

Some embodiments of the present invention provide for a bankcard terminal for regulating access to a first transit system, the bankcard terminal comprising: a first interface to communicate with a processing system associated with a set of transit systems including at least the first transit system, wherein the first interface provides for uploading information to the processing system and downloading information from the processing system; a bankcard reader comprising a receiver to receive data, as bankcard data, upon a current presentation of a bankcard by a holder; a processor, coupled to the bankcard reader and to the first interface, to receive the bankcard data and to determine an identifier of the currently presented bankcard; memory, coupled to the processor, to hold a set of bankcard records comprising, for each bankcard record in the set, an identifier of a bankcard previously registered with the processing system, and wherein the set of bankcard records identifies bankcards from a plurality of issuers; and a second interface, coupled to the processor, to send a signal to an access controller.

Some embodiments of the present invention provide for a method for validating entry into a first transit system using a bankcard terminal, the method comprising: downloading, from a processing system associated with a set of transit systems including the first transit system, a set of bankcard records comprising, for each bankcard record in the set, an identifier of a bankcard previously registered with the processing system, and wherein the set of bankcard records identifies bankcards from a plurality of issuers; receiving, from a bankcard reader, bankcard data comprising data from a bankcard currently presented by a holder of the bankcard; determining an identifier of the currently presented bankcard; determining whether the currently presented bankcard is contained in the set of bankcard records; attempting to verify the currently presented bankcard with a bankcard verification system, if the bankcard was not contained in the set of bankcard records; and denying access, if the act of attempting to verify the currently presented bankcard with the bankcard verification system results in a determination of an invalid bankcard. Some embodiments of the present invention provide for a computer-readable medium, comprising machine readable code for performing the same.

Some embodiments of the present invention provide for method for validating entry, into a first transit system, using a bankcard terminal, the method comprising: receiving, from a processing system associated with a set of transit systems including the first transit system, a set of bankcard records comprising, for each bankcard record, an identifier of a bankcard previously registered with the processing system, and wherein the set of bankcard records identifies bankcards from a plurality of issuers; receiving, from a bankcard reader, bankcard data comprising data from a bankcard currently presented by a holder of the bankcard; determining an identifier of the currently presented bankcard; determining whether the currently presented bankcard is contained in the set of bankcard records; denying access, if the currently presented bankcard is not contained in the set of bankcard records; and uploading, to the processing system, at least one bankcard identifier granted access to the first transit systems. Some embodiments of the present invention provide for a computer-readable medium, comprising machine readable code for performing the same.

Some embodiments of the present invention provide for processing system associated with a set of transit systems including at least one transit system, the processing system comprising: a first interface to communicate with at least one bankcard terminal; a processor coupled to the first interface; memory, coupled to the processor, to hold a set of bankcard records comprising, for each bankcard record in the set, an identifier of a bankcard previously presented, by a respective holder of the bankcard, to a registration system, and wherein the set of bankcard records identifies bankcards from a plurality of issuers; a second interface, coupled to the processor, to communicate with a bankcard verification system; and a third interface, coupled to the processor, to communicate with a bankcard registration system.

Some embodiments of the present invention provide for method for maintaining a set of bankcard records at a processing system associated with a set of transit systems including at least one transit system, the method comprising: receiving, from a bankcard registration system, a registration request containing bankcard data of a bankcard presented by a respective holder of the bankcard; determining an identifier of the presented bankcard; determining whether the presented bankcard is contained in a set of bankcard records comprising, for each bankcard record in the set, an identifier of a bankcard previously presented to the processing system, and wherein the set of bankcard records identifies bankcards from a plurality of issuers; attempting to verify, with a bankcard verification system, eligibility of the presented bankcard for a future purchase; and downloading, to at least one bankcard terminal, the set of bankcard records. Some embodiments of the present invention provide for a computer-readable medium, comprising machine readable code for performing the same.

These and other aspects, features and advantages of the invention will be apparent from reference to the embodiments described hereinafter.

BRIEF DESCRIPTION OF THE DRAWINGS

Embodiments of the invention will be described, by way of example only, with reference to the drawings.

DETAILED DESCRIPTION OF THE INVENTION

In the following description, reference is made to the accompanying drawings, which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense. Furthermore, some portions of the detailed description that follows are presented in terms of procedures, steps, logic blocks, processing, and other symbolic representations of operations on data bits that can be performed in electronic circuitry or on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in electronic circuitry or in a computer system. These signals may be referred to at times as bits, values, elements, symbols, characters, terms, numbers, or the like. Each step may be performed by hardware, software, firmware, or combinations thereof.

A network of transit systems includes one or more transit systems providing local, regional and/or long distance commuter transportation. This transportation takes in the form of mass transit, shuttle or taxi services by way of roads, railways, air and waterways using one or more modes of transportation, such as by bus, shuttle, trolley, train, light rail, heavy rail, subway and/or the like. Typically, a commuter purchases a ticket or other pass, which permits access to the transit system. Some transit systems require a commuter to purchase a transit coin, which the commuter deposits into a turnstile to open a gate. Use of a transit system may be regulated by a physical gate or turnstile or controlled by a conductor. Alternatively, use of a transit system may be un-gated. For example, it may be regulated using a pass or by an honor system, such as found in a transit system having an un-gated, open platform. In some transit systems employing an honor system, a conductor may occasionally verify that commuters have a valid pass.

In accordance with embodiments of the present invention, a transit system may allow a commuter to enter the transit system using a pre-registered bankcard. In some embodiments, a transit system may allow the commuter to enter the transit system using an unregistered bankcard. A bankcard assists in uniquely identifying an account of funds, contains digital data in memory, provides for access to at least some of its digital data by an external device, and may provide for contactless data transfer.

Hereinafter, a bankcard, such as a credit card or a debit card, is a payment token that may be linked to a bank account or credit line. Bankcards include cards and tokens in any of a number of form factors. A bankcard may be dimensioned in accordance with ISO 7810/7813 ID1 (about 3.375"×2.125"× 0.0030", commonly know as "Credit Card Format"). Alternatively, a bankcard may take other forms. A bankcard may take the form of a key fob (e.g., as issued by Speedpass™) or wristband. Alternatively, the bankcard may be embedded into or integrated with a mobile phone or other handheld device. A bankcard includes memory to hold an identifier used to uniquely identify an account for billing. The memory may be in the form of a magnetic stripe and/or may be attached to circuitry, which may be in accordance to ISO 7816. A bankcard may include or be integrated with contactless circuitry, such as ISO 14443. In some embodiments, a bankcard includes a token issued by a third party that is not a transit agency, such as a bank, credit union, a government agency (issuing a state driver's license or DMV issued identification card, federal government issued passport and/or other government issued ID).

In some embodiments, a bankcard reader may be used by a retailer, service provider and other merchant to accept payment from a bankcard holder's payment account. Bankcard readers may be located in a variety of places such as stores and kiosks. Clearing and settlement networks may be used by a retailer, service provider and other merchant to receive payment from an account holder's credit card or debit card account via the merchant's acquirer. An example of a clearing and settlement network are computing resources available via the MasterCard® Banknet® telecommunications network, such as the Global Clearing Management System (GCMS), and the Settlement Account Management (SAM) system. Another are the resources available through VISA® VisaNet. An account holder linked to a bankcard may belong to the bankcard holder or, alternatively, may be linked to another entity such as the bankcard holder's employer, parent, spouse or other family member. For additional detail, see U.S. Pat. No. 5,828,044, the contents of which are incorporated by reference herein.

Were it not for the desire to prevent fraud and abuse of such a system, its design would be very straightforward; a payment terminal would simply buffer and store the data of all cards presented until it eventually connects to the acquirer. Unfortunately, experience dictates that systems should be equipped with a means to prevent fraud. As described above, a conventional terminal contacts the card's issuer. A system abandoning the procedure of immediate verification brings about a need for an alternative scheme or technique to limit fraud and abuse.

A solution to both of the above problems is a system that can accept bankcards off-line and can also provide an acceptable business risk of accepting bad bankcards. In such a system, payment terminals are communicating transaction data to the acquirer asynchronously (meaning the payment terminal records a transaction's data, including card data, for later communication to the acquirer). Additionally, the terminal decides off-line whether a card should be accepted or denied. In other words, the terminal does not contact the card's issuer to obtain authorization for the transaction. An issuer (or its agent) issues bankcards to cardholders. An issuer may be an institution such as a retail bank (e.g., Chase, CitiBank), a credit card company (e.g., Capital One, MBNA and Providian), or a network (e.g., American Express).

One method maintains a black list (e.g., see, U.S. Pat. No. 5,828,044). In this method, the payment terminal uses a periodically updated black list to support the approval-denial decision. In accordance with the current invention, a system using this method would place a card identifier on a black list if charges to the card holder's account could not be cleared. Placing the card on the black list aids in preventing future charges that may also fail to clear. In some embodiments, a card is placed on a black list with a single failed clearing attempt. In other embodiments, a card is placed on the black list after a predetermined number of failures of a clearing occur. Once an outstanding debt has been repaid, the system would remove the card identifier from the black list. Unfortunately, the security of this scheme may be thwarted by a generic bankcard that is reprogrammed prior to each use such that it had different account information. A black list approach alone may be ineffective if such a generic bankcard is used.

Another method maintains a white list. In accordance with the current invention, a white list contains card information for each card pre-validated or pre-registered for the system. A system using cards that are validated before a first use substantially reduces the business risk inherent with the black list system describe above, in which a card is black listed after the offending transaction(s) have already been approved by the payment terminal. The fact that a bad card cannot be detected until after an initial presentation may be a bigger problem than immediately obvious.

Pre-registration forces an additional step, which inhibits the consumers in making a purchase. To maintain consumer convenience, a black list system may further include heuristic checks to assist in preventing severe fraud. Heuristic checks are particularly suited to contactless credit cards. Such a heuristic security scheme may measure and score a large number of secondary indicia. Such indicia could include: (1) any card identifiers, such as Card Holder Name, Account Identifier, Chip Model, Chip Serial Number, Chip Manufacturer Identifier; (2) make and version of the Card Operating System of the Smart Card if any (e.g., Open Platform or MULTOS); (3) transaction flow, including overall transaction time (e.g., whether or not prolonged pauses are experienced in a particular step of the transaction, or whether or not any step performs slower or faster than expected); and/or (4) CVC1/CVC3 checking (note that even though the card verification code might not be verified in an off-line environment, it may be stored for later validation, leading to the black listing of a card if it does not clear; also note that for a CVC1 or if the CVC3 is determined to be static, it may be used in future validations).

These measurements may be scored by any of a plurality of algorithms, some specific to a measurement or class of measurements. The overall score may be compared to a preset threshold to determine whether the transaction will be accepted or not. Such scoring algorithms could include the following: (1) change of static indicia (e.g., whether or not any of the card's static attributes change, such as the identifiers, the card operating system or the expiration date; note that provisions may be made for replacement cards, where replaced cards must be rejected and a velocity check must be performed on the number of new cards per card holder); (2) duplicate unique attributes (e.g., whether or not another card has an identical attributes, even though it is supposed to be unique; examples of unique attributes include the account number or card serial number; note that a special case to consider includes where cardholders shares an account, so that their cards have the same card number); (3) black and white lists (e.g., whether or not a card is marked as inactive in a negative list or the card is marked as active in a positive list); and/or (4) time series analysis (e.g., whether or not a time series analysis of a measurement's past results indicate that the current result is unexpected; note that such time series analysis ranges from simple statistics such as a velocity check (for example, "no more than 3 authentications per minute") to advanced usage pattern analysis such as geographical location checking (for example, "if last transaction occurred more than 120 miles away and within an hour, then it cannot be valid.")).

In either approach (i.e., a pre-registration system using a white list or post-validation system using a black list), the bankcards function primarily as identifying tokens until the total charge is computed on a back-end fare processor.

Conceptually, such a fare processor may be situated between the payment terminals and the acquirer. The fare processor receives records of all bankcards that are presented to the payment terminals. The fare processor also computes a final charge due when desirable (e.g., after a sufficient number of presentation records have been received) and may retroactively correct charges when additional records indicate that the rider was overcharged or undercharged. These computations and corrections are necessary to account for complex fare products such as those involving transfers or inter-regional travel. For this purpose, the fare processor may have access to an historical database in which past bankcard presentations are recorded, including purchases of time, distance and ride-based passes, as well as other related information, such as age of a rider (for age discounts), linkage to multiple cards belonging to a single person and/or linkage to transit benefit accounts.

Bankcards are a natural choice of identifying token for mass transit because they are widely available and are intrinsically linked to a credit account and/or a debit account. Still, an off-line payment system may be designed to use other identifiers, such as a government ID (e.g., driver's license) or proprietary tokens (e.g., a Mobil Speedpass™). In cases where such a token is not intrinsically linked to a credit or debit account, that link may be established, for example, through a website, via the phone or over the counter.

Conversely, bankcards can be used as identifying tokens, even if no payment is due. For example, a bankcard may be used for file retrieval (e.g., in the medical field), for building access, for information access, for age verification and/or for check out purposes in a public library. Using a credit card for access control has the added advantage that stealing a credit card might be a felony, while stealing a non-credit card dedicated identifier might not be a felony.

In addition to using a bankcard in a mass transit system (for example, a system having payment terminals embedded in subway gates or at fare boxes) as described above, other domains may use such off-line credit card terminals. For example: (1) purchases while being transported (e.g., in a plane, train, ship such as meals, entertainment, vending purchases and communications access fees); (2) donations to government programs (e.g., to parks and clean highway programs); (3) purchases at campgrounds (e.g., services, boat rental, firewood and trail access); (4) payment for municipal services (e.g., parking meters, garbage depots, swimming pools); (5) charity and gifts (e.g., by way of street solicitation with branded and trusted portable units); (6) purchase from street, beach, and stadium vendors (e.g., for hot dogs, ice cream, beverages or entertainment); and (7) other off-the-grid sales (e.g., fairground kiosks, food delivered to home, bicycle couriers, concerts, etc.).

Contactless payments using a contactless bankcard are particularly suitable for use in the aforementioned applications of off-line terminals. The ISO (the International Organization for Standardization) and JEC (the International Electrotechnical Commission) have formed a specialized system for worldwide standardization including the ISO/IEC 14443 standard. The ISO/IEC 14443 standard, which is a four-part international standard for Contactless Smart Cards, specifies physical characteristics of proximity cards operating in close proximity with a reader antenna. The ISO/IEC 14443 standard is the basis for the American Express® ExpressPay, Chase blink, MasterCard PayPass® and Visa Contactless implementations. Advantageously, such systems using contactless payment readers require very little maintenance and may be made more vandal resistant than contact-type readers. Also, a contactless card does not make use of a card's magnetic stripe, which may otherwise wear out relatively quickly with frequent use (e.g., when used twice a day to pay for the subway) in a contact-type system. Contactless cards further provide additional benefits that are unavailable with magnetic stripe cards (e.g., it is possible to gain exit data in a transit system).

Many mass transit systems require the presentation of a payment token upon entry, but only some require the presentation on exit of the system or vehicle. To facilitate the gathering of rider ship statistics, which are vital in deciding where to make the capital investments, an antenna may be installed near an exit (e.g., in the ground underneath gates, or in the floor of a bus exit) to collect exit information without explicit presentment of the card by the rider. At the exit as the card holder walks over the antenna, the card holder's cards are read. In some environments, not every card would be successfully read, for example, because the reader may be working far outside the ISO 14443 specification. As a result, the information gathered may suffice for statistical purposes.

Figure 1:
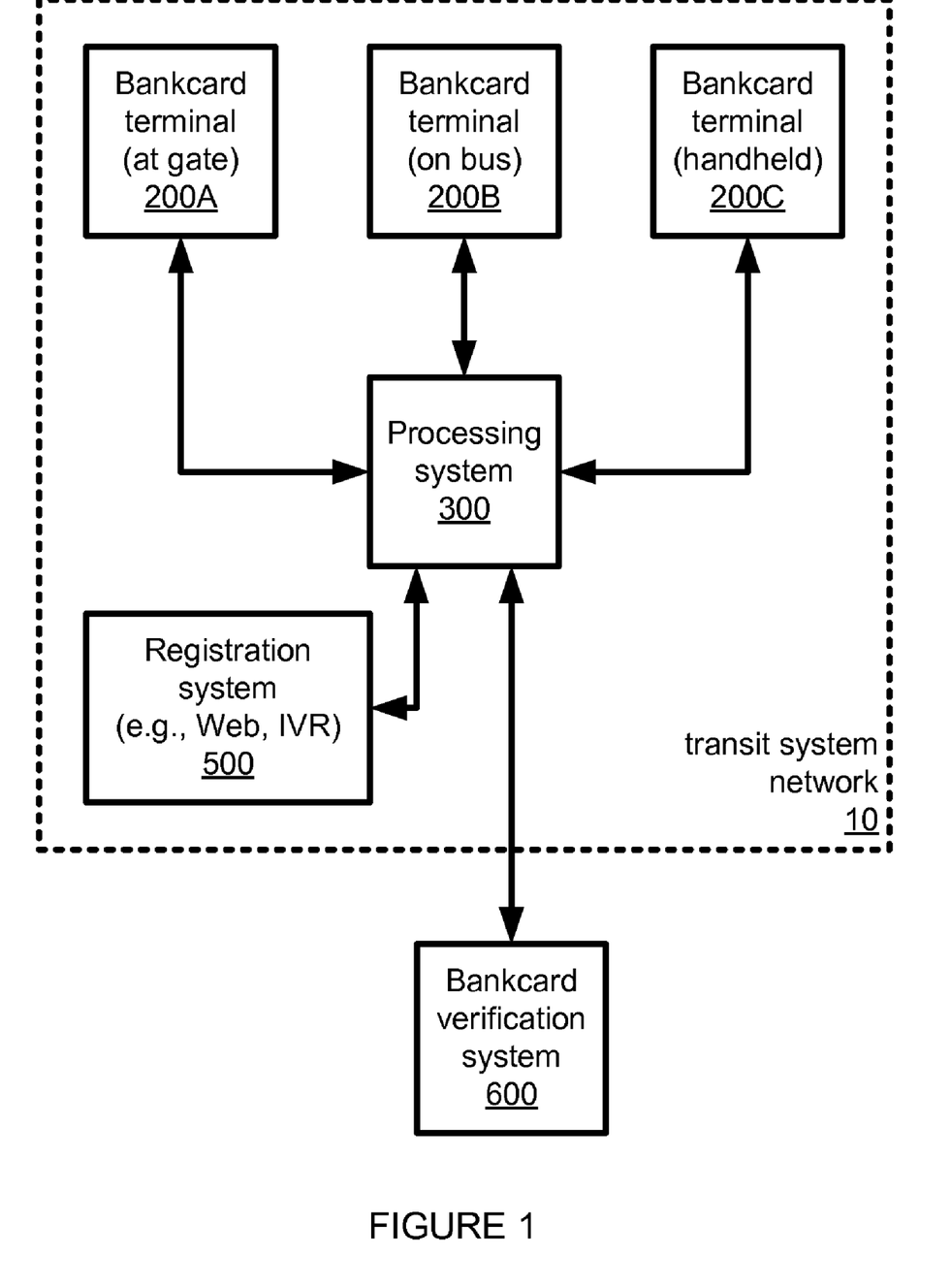
FIG. 1 shows a transit system network with an associated processing system and various components, in accordance with embodiments of the present invention.

FIG. 1 shows a transit system network 10 with an associated processing system 300 and various components, in accordance with embodiments of the present invention. Transit system network 10 includes bankcard terminals 200. Bankcard terminals 200 provide a front-end interface to bankcards. A bankcard terminal 200A may take the form of a turnstile at a gate in subway system. Alternatively, a bankcard terminal 200A may be used on a transit system incorporating a self policing or honor system (i.e., a passenger may enter into the transit system without being physically gated by a turnstile; the passenger voluntarily provides his or her bankcard to the bankcard terminal 200A; in this case, gating may simply be provided by an audio and/or visual indicator, which requires the passenger to honor). A bankcard terminal 200B may and the only integrated into a bill or coin collection terminal on a bus. A bankcard terminal 200C may be a handheld device used by a conductor in a train. Collecting information from each of the bankcard terminals 200 is a processing system 300. Processing system 300 may interface to a bankcard terminal via a wired connection or a wireless connection. The interface may provide a real-time connection, such as a dedicated wire between a turnstile at a gate and processing system 300. Alternatively, the interface may provide be an intermittent connection, such as a wireless connection. In some cases, a connection between a bankcard terminal 200 and processing system 300 may be made after a long period of service. For example, at the end of the day the connection may be made between a bankcard terminal 200B in a bus when the bus retires to the garage or a handheld bankcard terminal 200C is brought back to the station.

Processing system 300 may also include one or more interfaces to a registration system 500 and a bankcard verification system 600. Registration system 500 provides a back-end interface to bankcards. A bankcard holder may register a bankcard with processing system 300 via a web interface, using an interactive voice response (IVR) system, at a interactive kiosk or using a vending machine. Bankcard verification system 600, such as settlement and clearing networks used by credit card companies, verify that a bankcard is a currently valid bankcard.

Figure 2A:
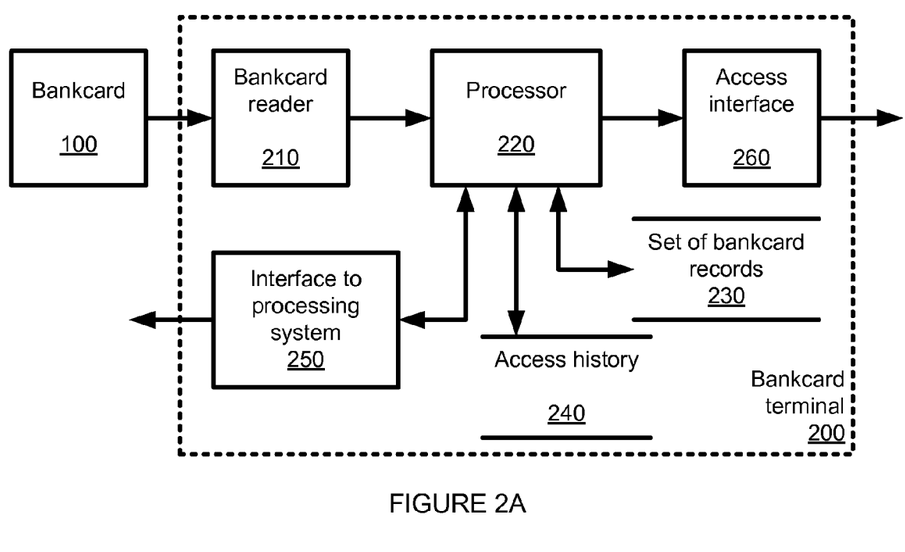
FIG. 2A shows a bankcard terminal, in accordance with embodiments of the present invention.

FIG. 2A shows a bankcard terminal 200, in accordance with embodiments of the present invention. Bankcard terminal 200 includes a bankcard reader 210, a bankcard terminal processor 220, memory to hold a set of bankcard records 230 and access history 240, a first interface 250 to a processing system 300, and a second interface 260 to assist in gating access.

In some embodiments, bankcard reader 210 provides a physical, electromagnetic, optical, magnetic, and/or radio frequency (RF) interface to bankcards 100. Bankcard reader 210 may be a receiver without a transmitter or may include both a receiver and transmitter to communicate with a bankcard 100. A bankcard may transmit bankcard data including: (1) a cardholder's name; (2) a bankcard number (e.g. a PAN as defined in ISO/IEC 7812); (3) an expiration date; (4) security data (e.g., the result of a cryptographic operation based on one or more cryptographic keys stored in the card's memory); (5) issuer private data; and/or (6) records or summaries of past transactions.

In some embodiments, bankcard reader 210 simply reads data from bankcard 100 as bankcard 100 passes by it. In some embodiments, bankcard reader 210 transmits a signal to bankcard 100 to access bankcard data. Bankcard reader 210 forwards selective bankcard data or all bankcard data received to bankcard terminal processor 220.

Bankcard terminal processor 220 includes a first interface 250 to a processing system 300 and a second interface 260 to assist in gating access, as well as an interface to memory. Bankcard terminal processor 220 may be implemented with a microcontroller, a microprocessor and/or other logic circuitry. Bankcard terminal processor 220 reads, writes and updates data in memory, such as the set of bankcard records 230, which contains a set of known bankcards, and an optional access history 240, which keeps a history of bankcards presented to bankcard terminal 200 and may be used for billing. The set of bankcard records 230 and access history 240 may be in the form of one or more sequential lists, tree structures, sorted data structures and/or databases, which may be indexed or searchable by an identifier such as a hash value or a credit card number of a bankcard. The set of bankcard records 230 may be presorted for faster subsequent searching. The set of bankcard records 230, access history 240 and identifiers are described in more detail below.

First interface 250 provides an interface to a processing system 300. Interface 250 may be a dedicated interface providing a continuous connection between terminal bankcard 200 and processing system 300. Alternatively, first interface 250 provides for periodic or intermittent connectivity to processing system 300. With the link between first interface 250 and processing system 300 may be the wired or wireless.

Second interface 260 provides an interface to assist in regulating access. To assist in regulating access, in some embodiments second interface 260 may activate a barrier or gate while in another embodiments second interface 260 may simply activate a red or green light either observable by a conductor, gate operator and/or the commuter. Second interface 260 may provide a signal to open the turnstile. Second interface 260 may provide a signal to activate an audio and/or visual announcement. For example, second interface 260 may send a signal to an LCD display or and LED in a handheld unit that is observed by a conductor.

Figure 2B:
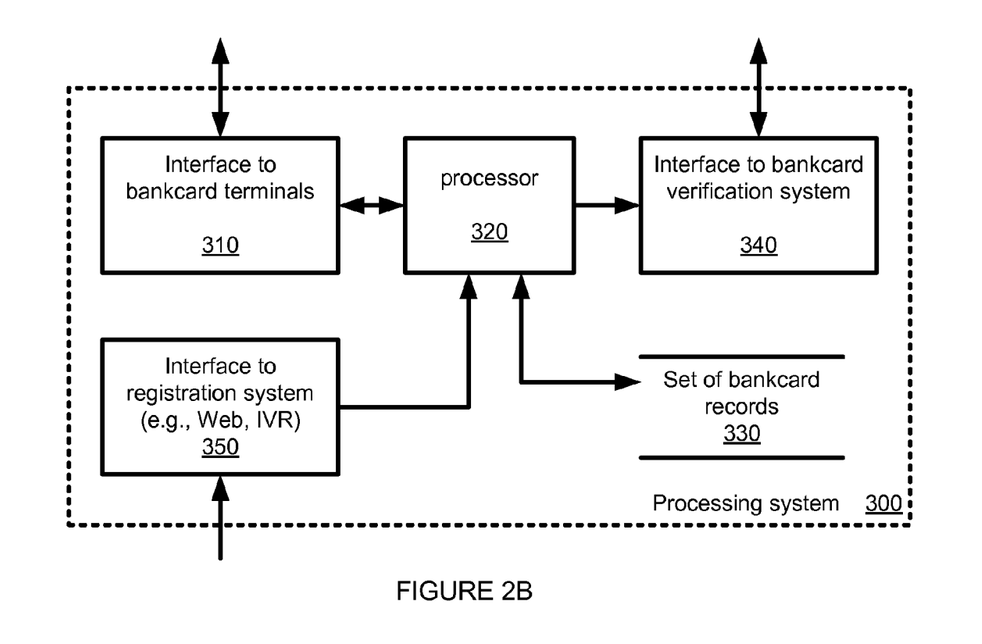
FIG. 2B shows a processing system, in accordance with embodiments of the present invention.

FIG. 2B shows a processing system 300, in accordance with embodiments of the present invention. Processing system 300 is associated with one or more transit systems and may be part of or separate from the transit systems. Processing system 300 includes a first interface 310 to communicate with one or more bankcard terminals 200, a processor 320, memory, a second interface 340 to communicate with a bankcard verification system, and a third interface 350 to communicate with a bankcard registration system.

Processor 320 is coupled to and communicates with first, second and third interfaces 310, 340 and 350, respectively. Processor 320 is also coupled to memory and manipulates a set of known bankcards 330 held in the memory. The set of known bankcards 330 may contain bankcard data (such as a bankcard number, usually a PAN and/or a PAN alias as described below) or one or more hash values computed from the bankcard data. Processor 320 may be implemented with a microcontroller, a microprocessor and/or other logic circuitry.

The set of bankcard records 330 contains an identifier of each bankcard in the set. The bankcard 100 may be one that was previously presented by a respective holder of the bankcard 100 to processing system 300 and verified by processing system 300. A presentation may be by way of a physical presentation by the holder at a bankcard terminal 200 at a gate or entrance of a transit system. Alternatively, the presentation may be by way of registering the bankcard 100 over the telephone, for example, using an IVR system, or by way of registering using the Internet, for example, using a web browser. Alternatively, the presentation may be by a bank or other financial institution enabling the bankcard by communicating with processor 320. Such a financial institution may provide multiple presentations to processing system 300 individually or in a batch process.

At a bankcard terminal, bankcard data received via a magnetic stripe may differ from that received over the air through an RF connection, which may differ still from bankcard data received via a registration system. For example, bankcard data may contain a Primary Account Number (PAN), which is typically a 15-digit to 16-digit numeric code embossed on the face side of a bankcard, and which is also encoded in the magnetic stripe. PAN is further defined in ISO/IEC 7811 and ISO/IEC 7812. The PAN standard allows up to 19 digits. The PAN standard allows for three main components in the form nnnn nndd dddd ddds where: (1) nnnn nn is the Issuer Identification Number (IIN) (typically six digits); (2) dd dddd ddd is the NIH ID number or individual account identification (IAI) (up to twelve digits) without the check digit; and (3) s is the ISO/EIC 7812-1 check digit. A bankcard having a wireless chip may be coded with a different identifying number than the PAN. For example, when a bankcard communicates with an RF reader, it will send an alias or ghost of the PAN rather than the PAN itself. The PAN alias may need to be mapped to a PAN for further processing. Not all bankcards are in full compliance with aforementioned standards (e.g., some do not use a check digit). Some embodiments of the present invention operate with bankcards compliant with these PAN ISO/IEC standards while other embodiments operate with non-compliant bankcards not compliant to the PAN ISO/IEC standards. Still other embodiments of the present invention operate with a family of compliant and non-compliant bankcards.

If a bankcard is expected to provide different identifying data (e.g., PAN alias) rather than the credit card number (e.g., PAN), the bankcard terminal 200, processing system 300, verification system or the like will provide a translation between the alias PAN and the PAN. In some cases, the set of bankcard records 230 in the bankcard terminal 200 contains a PAN, an alias PAN, a hash value based on the PAN, and/or a hash value based on the alias PAN. In some cases, the set of bankcard records 330 in the processing system 300 contains a PAN, an alias PAN, a hash value based on the PAN, and/or a hash value based on the alias PAN.

As stated above, the set of bankcard records 230 may be presorted for faster subsequent searching. For example, the set of bankcard records 230 may be stored as a self-balancing tree. In some embodiments, a bankcard identifier is determined using the Issuer Identification Number (IIN) and the individual account identification (IAI) without the check digit. The check digit is not included in the determined bankcard identifier because it is simply a checksum value and does not provide any additional identification. In some embodiments, the determined bankcard identifier includes the individual account identification (IAI) and the record is stored together with other determined bankcard identifier having the same Issuer Identification Number (IIN). In these embodiments, a first lookup will search for the IIN and a second lookup will subsequently search for the IAI. In some embodiments, the IIN is used for the first search and a hash value is created and used for the IAI. In other embodiments, a first hash value is created for the IIN and a second hash value is created for the IAI. These embodiments provide for both compact storage and sufficient speed. Some embodiments require that the time between bankcard presentation by a cardholder and granting or denying access be within 200 milliseconds. Therefore, a search of the set of bankcard records 230 should be complete within 200 milliseconds.

Interfaces 310, 320 and 340 may share a common physical interface, for example, the physical interface may be an Ethernet connection to the Internet and/or an intranet. In this case, interfaces 310, 320 and 340 share a common physical interface but are logically three different interfaces. For example, interfaces 310, 320 and 340 may each have a unique socket identifier.

Figures 3, 4:
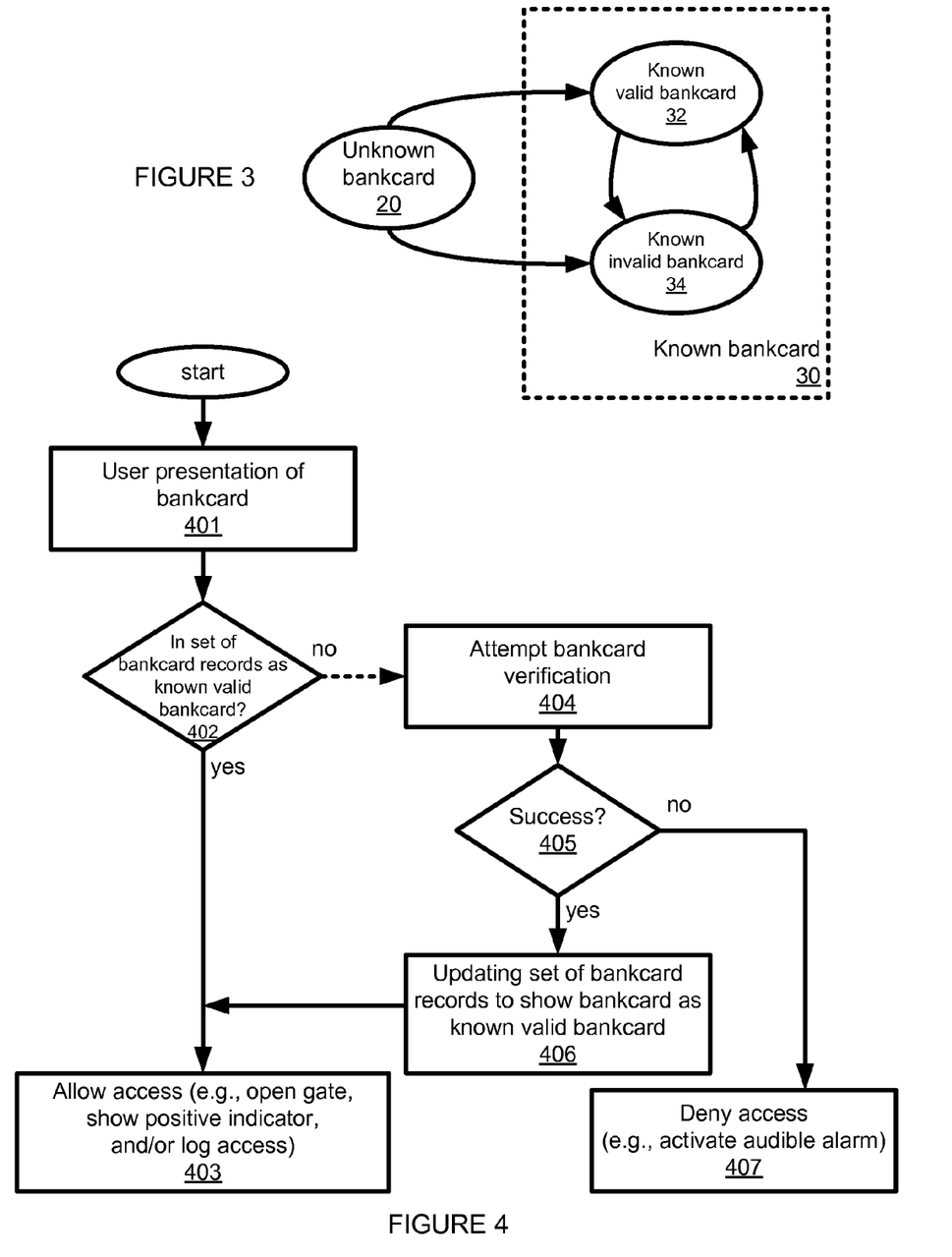
FIG. 3 illustrates a state diagram, in accordance with embodiments of the present invention.
FIG. 4 represents a flowchart implementation for operations in a bankcard terminal, in accordance with embodiments of the present invention.

FIG. 3 illustrates a state diagram, in accordance with embodiments of the present invention. Bankcards may be considered to be in one of two classifications: an unknown bankcard 20 or a known bankcard 30. An unknown bankcard 20 represents a bankcard that has not been presented by a respective holder of the bankcard. Thus, the set of bankcard records 230 (in FIG. 2A) and the set of bankcard records 330 (in FIG. 2B) will now have an identifier for the unknown bankcard 20.

When an unknown bankcard 20 is presented it becomes a known bankcard 30. A known bankcard 30 may also be considered to be in one of two classifications: a known valid bankcard 32 or a known invalid bankcard 34. A known valid bankcard 32 represents a bankcard that has been presented by a respective holder of the bankcard as well as verified with a bankcard verification system 600. A known invalid bankcard 34 represents a bankcard that has been presented by a respective holder of the bankcard 100; however, verification with a bankcard verification system 600 has failed in some respect. For example, bankcard terminal 200 or processing system 300 was unable to communicate with bankcard verification system 600. Alternatively, bankcard terminal 200 or processing system 300 communicated with bankcard verification system 600, which indicated bankcard 100 is somehow the invalid for a purchase. A known valid bankcard 32 may transition to a known invalid bankcard 34, for example, if an attempt to clear and settle a transaction fails. Similarly, a known invalid bankcard 34 may transition to a known valid bankcard 32, for example, if an attempt to verify or to clear and settle a transaction completes successfully.

FIG. 4 represents a flowchart implementation for operations in a bankcard terminal 200, in accordance with embodiments of the present invention. In 401, a respective holder of a bankcard 100 presents the bankcard to a bankcard terminal 200 for access to a transit system. Bankcard terminal 200 reads, from the bankcard, bankcard data including a bankcard identifier. Bankcard terminal 200 determines an identifier, such as a credit card number read from the bankcard data or by computing a hash value based on the bankcard identifier.

A bankcard terminal 200 may receive bankcard data from one or more of several paths. First, a bankcard terminal 200 may receive bankcard data directly from a bankcard's magnetic stripe (e.g., a bankcard holder may pass a magnetic stripe of a bankcard 100 through a magnetic stripe reader on the bankcard reader 210). Second, a bankcard terminal 200 may receive bankcard data via an RF connection between the bankcard terminal 200 and the bankcard (e.g., a wireless chip in a bankcard 100 may communicate with a radio transceiver in a bankcard reader 210). Third, a bankcard terminal 200 may receive bankcard data directly from electronic contacts to a smart chip on the bankcard. Fourth, bankcard terminal 200 may receive bankcard data from a processing system 300, which previously received bankcard data from an external connection (e.g., IVR system, Internet/web interface, and/or financial institution and/or one or more agents of financial institutions). After receiving and processing bankcard data received from an interface to a registration system 350, the processing system 300 may send bankcard data to a bankcard terminal 200 through its interface 310.

A hash function may be used to compute a hash value from the bankcard data. A hash function or hash algorithm is a reproducible method of turning bankcard data into hash data that may serve as a digital fingerprint of the bankcard data. The hash function may be considered to chop and mix (i.e., substitutes or transposes) the data to create such a fingerprint. The fingerprint may be called hash sums, hash values, hash codes or simply hashes. The hash computation may be based on a cryptographic hash function. Broadly speaking, a cryptographic hash function behaves like a random function while still being deterministic and efficiently computable.

In 402, bankcard terminal 200 uses the determined identifier to tell whether or not the bankcard is contained in a set of bankcard records and whether or not the bankcard is a known valid bankcard. In some embodiments of bankcard terminal 200 that have an interface to a bankcard verification system 600, an attempt is made to verify the bankcard at 404. At 405, bankcard terminal 200 determines whether or not the bankcard was successfully verified. At 406, if the bankcard was successfully verified, the set of bankcard records 230 is updated with the determined identifier for the currently presented bankcard. At 407, if the verification was unsuccessful, access is denied, for example by not opening a gate and/or by activating an audio and/or visual indicator to the bankcard holder and/or to a conductor. At 403, if the determined identifier was already in the set of bankcard records 230 as a known valid bankcard or was added to the set of bankcard records (at 406), access to the transit system is allowed, for example, by opening the gate and/or by activating an audio and/or visual indicator to the bankcard holder and/or to a conductor.

Figure 5A:
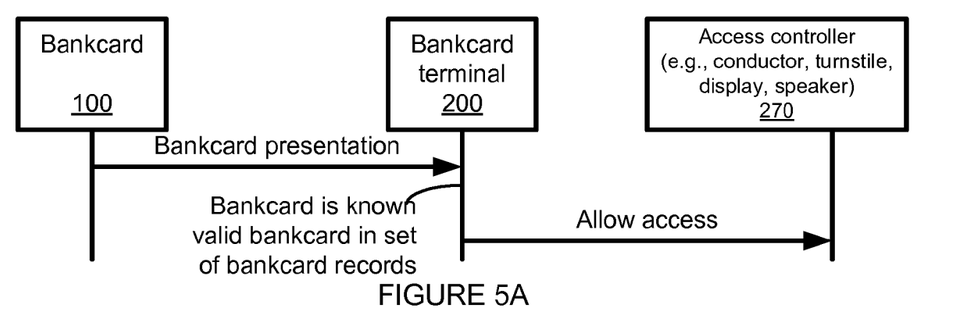
FIGS. 5A, 5B and 5C show message flow between network components, in accordance with embodiments of the present invention.
Figure 5B:
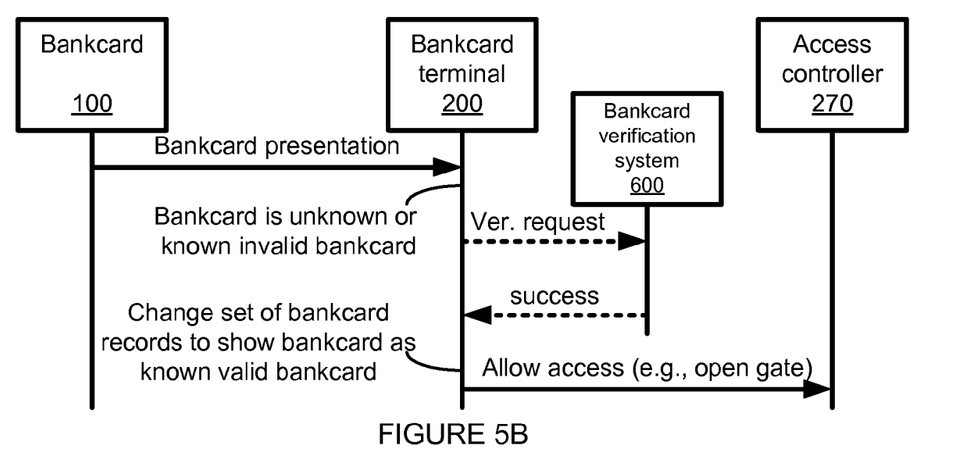
Figure 5C:
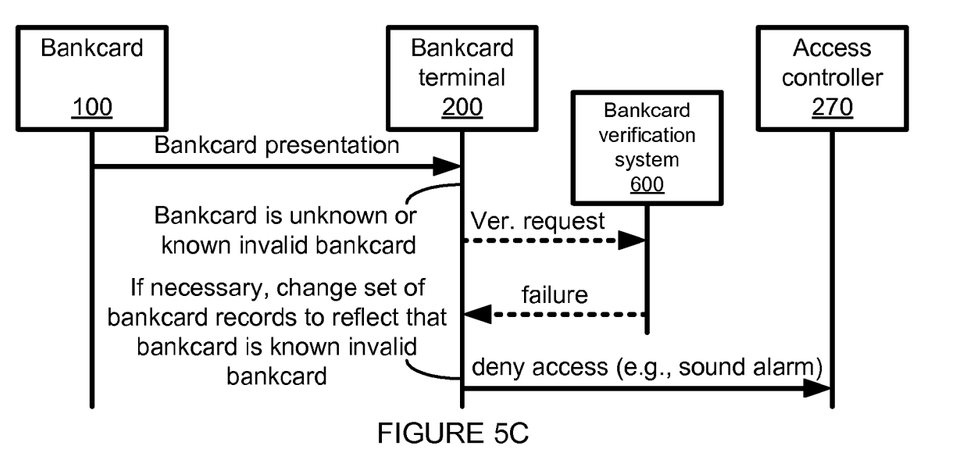

FIGS. 5A, 5B and 5C show message flow between network components, in accordance with embodiments of the present invention. In FIG. 5A, a bankcard 100 is currently presented by a bankcard holder (e.g., a subway commuter or bus rider). Bankcard reader 210 in bankcard terminal 200 receives bankcard data comprising data from the bankcard currently presented. Bankcard terminal processor 220 in bankcard terminal 200 determines an identifier (e.g., a hash value or a credit card number) of the currently presented bankcard. Next, bankcard terminal processor 220 uses the determined identifier to tell that the currently presented bankcard is contained in the set of bankcard records 230. Bankcard terminal processor 220 signals second interface 260 to communicate with the access controller 270. Access controller 270 may be, for example, a conductor, a gate of the turnstile or a bus driver or other human providing oversight or control.

To assist in gating access, in some embodiments second interface 260 may activate a barrier while another embodiments second interface 260 may simply the activate a red or green light either observable by a conductor, gate operator and/or the commuter. Second interface 260 may provide a signal to open the turnstile. Second interface 260 may provide a signal to activate an audio and/or visual announcement. For example, second interface 260 may send a signal to an LCD display or an LED in a handheld unit that is observed by a conductor.

In FIG. 5B, bankcard terminal 200 may have real-time access to bankcard verification system 600. If the bankcard is unknown, bankcard terminal 200 may attempt to validate the bankcard with bankcard verification system 600. The bankcard terminal 200 may receive a PAN (or alternatively an alias PAN as described above), which it uses to identify the bankcard to the bankcard verification system. If successful, bankcard terminal 200 allows access and update the set of bankcard records 230 to show the currently presented bankcard is a known valid bankcard. In FIG. 5C, bankcard terminal 200 fails to successfully validate the bankcard. In this case, access is denied, for example, by sounding alarm and/or not opening a gate.

Figure 6:
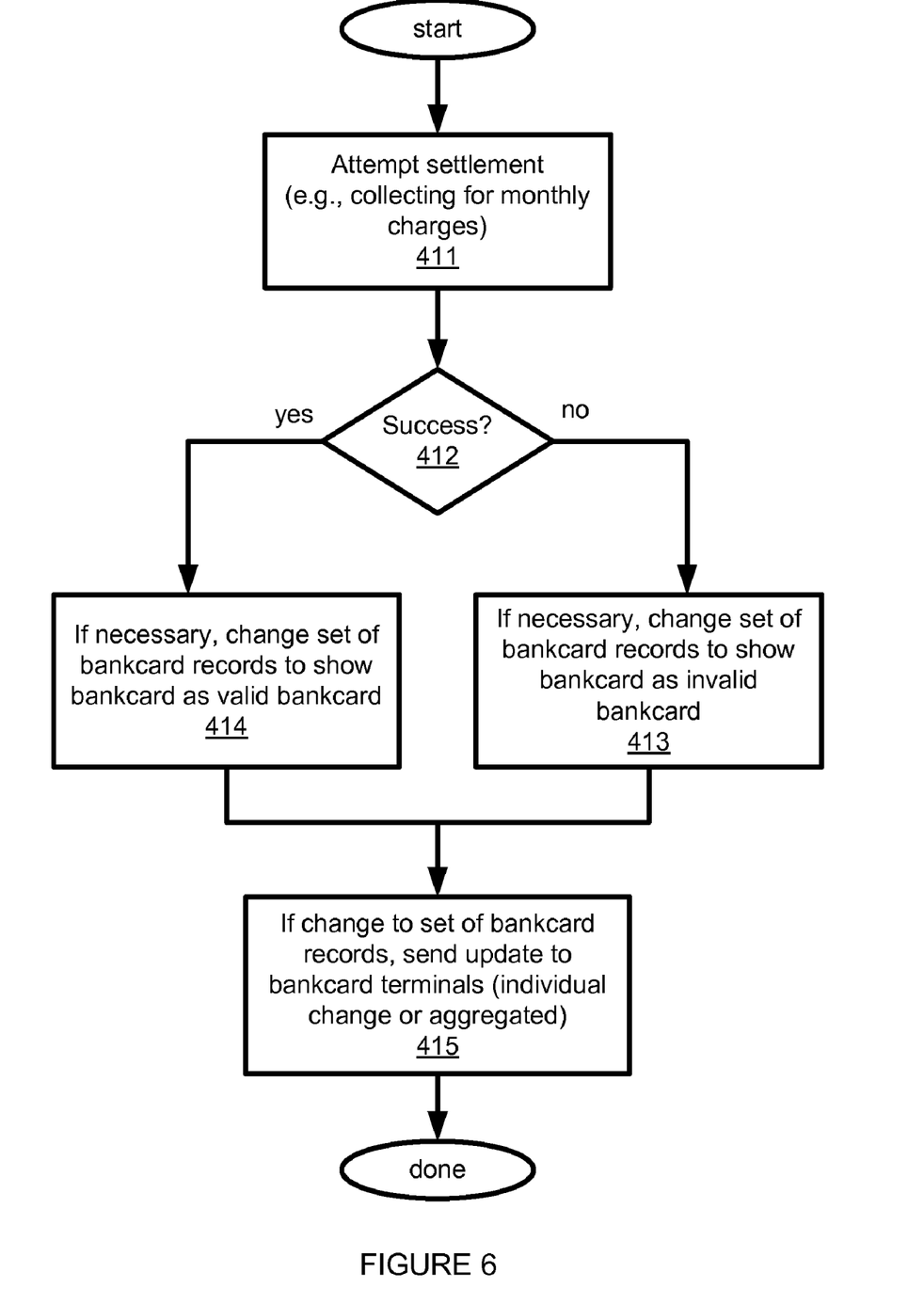
FIGS. 6 and 7 represent flowchart implementations for operations in a processing system, in accordance with embodiments of the present invention.
Figure 7:
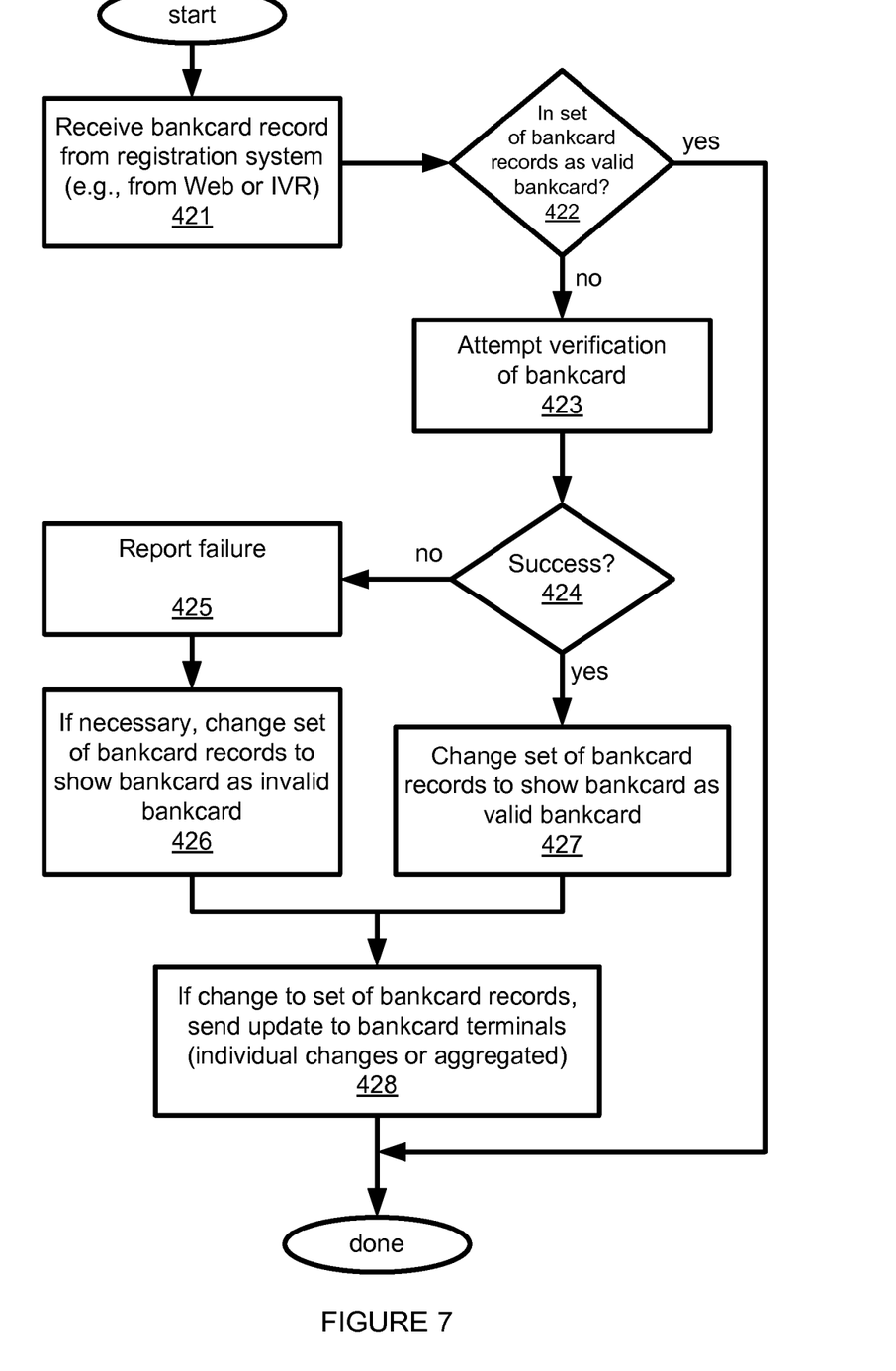

FIGS. 6 and 7 represent flowchart implementations for operations in a processing system, in accordance with embodiments of the present invention. In FIG. 6, at 411, processing system 300 attempts settlement, for example, to collect for monthly charges. At 412, a determination is made whether the attempt was successful. At 413, if the attempt was unsuccessful, the set of bankcard records 230 may be updated to indicate the bankcard is now invalid. At 414, if the attempt was successful, the set of bankcard records 230 may be updated to indicate the bankcard is valid. At 415, if changes are made to the set of bankcard records 230, an update may be provided to each bankcard terminal. The update may be provided as a new set of bankcard records 230 that the bankcard terminal will use as a replacement set. Alternatively, the update may be provided as incremental changes to the existing set.

FIG. 7, at 421 to 428, shows a process to register bankcards with a back-end through a web interface, kiosk, telephone or other interactive system such as used by a financial institution. Through the registration process, a processing system 300 associated with a set of transit systems including at least one transit system maintains a set of bankcard records.

At 421, a processing system 300 receives, from a bankcard registration system through its interface 350 to the registration system, a registration request. The registration request is a request by the remote bankcard holder or by a financial institution or its agent to register the bankcard with the processing system 300. By pre-registering the bankcard, future regulation of entry or access to any of the set of transit systems may be more quickly performed, for example, because a remote bankcard terminal 200 will not need to perform an authorization or clearing and settlement request with a distant bankcard verification or clearing and settlement system. The registration request contains bankcard data of a bankcard presented by a respective holder of the bankcard. The bankcard data may include an identifier of the bankcard such as the PAN or credit card number. Next, the processing system 300 determines an identifier of the presented bankcard. This determined identifier of the presented bankcard may be used as an index to a database or lookup table and may be a PAN or a credit card number or derived from the PAN or credit card number such as through a hashing function.

At 422, the processing system 300 determines whether the determined identifier is contained in a set of bankcard records. The set of bankcard records includes identifying information of bankcards that were previously presented to the processing system 300. These previously presented bankcards include bankcards from a plurality of issuers. For example, the set contains at least one bankcard from a first issuer (e.g., Chase®) and at least one bankcard from a second issuer (e.g., American Express®). The plurality of issuers may contain two or more issuers including, for example, Chase, American Express, Citi®, Bank of America®, Discover®, MasterCard®, Visa® and the like. The set contains a number of values for each bankcard including an identifier of a bankcard previously presented to the processing system. This identifier in the set may be searchable and may be used by the processing system 300 when determining whether the determined identifier is contained in a set of bankcard records.

At 423, the processing system 300 attempts to verify the bankcard through a bankcard verification system. The attempt to verify the currently presented bankcard with the bankcard verification system may include attempting to verify the currently presented bankcard with a clearing and settlement network. Alternatively, the attempt to verify the currently presented bankcard with the bankcard verification system may include receiving an authorization, from a clearing and settlement network, for an amount of funds from an account linked to the currently presented bankcard. In some circumstances, the attempt to verify the currently presented bankcard with the bankcard verification system may result in a failed attempt. For example, the attempt to verify the currently presented bankcard with the bankcard verification system may result in receiving, from the bankcard verification system, an indication that the bankcard verification system rejects the authorization of a financial charge.

By verifying the bankcard, the processing system 300 determines whether the bankcard will be eligible or ineligible for a future purchase. At 424, if the verification is not successful, the processing system 300 reports this failure at 425. That is, the processing system 300 reports a failure, if attempting to verify the presented bankcard results in a determination of an invalid bankcard. At 426, if the set contains invalid or ineligible bankcards, the processing system 300 changes the set to show that the bankcard is an invalid bankcard. That is, the processing system 300 removes, from the set of bankcard records, the present bankcard, if attempting to verify the presented bankcard results in the determination of an invalid bankcard. At 424, if the verification is successful, the processing system 300 changes the set to show that the bankcard is a valid bankcard at 427. That is, the processing system 300 incorporates the presented bankcard into the set of bankcard records, if attempting to verify the presented bankcard with the bankcard verification system results in receiving an indication of a valid bankcard.

In either case at 428, if the processing system 300 made a change to the set of bankcard records, it will communicate, to at least one bankcard terminal 200, updates to the set of bankcard records. The updates may be made either individual for each received bankcard record or may be aggregated as a batch update. The update may be downloaded to a bankcard terminal 200 by an electronic data connection or may be made by physically porting a memory device (e.g., a CD-ROM or flash drive) from the processing system 300 to the bankcard terminals 200.

In some embodiments, the set of bankcard records 230 contains only bankcards presented to the system at the front-end through bankcard terminal. In other embodiments, the set of bankcard records 230 contains only bankcards presented to the system at the back-end through a registration system. Still in other embodiments, the set of bankcard records 230 contains only bankcards presented to the system at either the front-end or the back-end. In some embodiments, the set of bankcard records 230 contains only bankcards individually by a holder of the bankcard. In some embodiments, the set of bankcard records 230 contains only bankcards individually by a holder or holder's agent of the bankcard. In a sense, each of the presentations is learned by the system. In some embodiments, the set of bankcard records 230 includes bankcards presented by a financial institution, or the like, in addition to the learned bankcards.

The description above provides various hardware embodiments of the present invention. Furthermore, the figures provided are merely representational and may not be drawn to scale. Certain proportions thereof may be exaggerated, while others may be minimized. The figures are intended to illustrate various implementations of the invention that can be understood and appropriately carried out by those of ordinary skill in the art. Therefore, it should be understood that the invention can be practiced with modification and alteration within the spirit and scope of the claims. The description is not intended to be exhaustive or to limit the invention to the precise form disclosed. It should be understood that the invention can be practiced with modification and alteration.

What is claimed is:

1. A bankcard terminal for regulating access to a first transit system, the bankcard terminal comprising:
   a first interface to communicate with a processing system associated with a set of transit systems including at least the first transit system, wherein the first interface provides for uploading information to the processing system and downloading information from the processing system;
   a bankcard reader comprising a receiver to receive data, as bankcard data, upon a current presentation of a bankcard by a holder, wherein the bankcard comprises one of a credit card and a debit card;

a processor, coupled to the bankcard reader and to the first interface, to receive the bankcard data and to determine an identifier based on at least part of the bankcard data from the currently presented bankcard;

memory, coupled to the processor, to hold a set of bankcard records comprising, for each bankcard record in the set, an identifier of a bankcard previously registered with the processing system, and wherein the set of bankcard records identifies bankcards from a plurality of issuers; and a second interface, coupled to the processor, to send a signal to an access controller.

2. The bankcard terminal of claim 1, wherein the bankcard data is compliant with standard ISO/IEC 7812.

3. The bankcard terminal of claim 1, wherein the receiver of the bankcard reader comprises a wireless receiver.

4. The bankcard terminal of claim 1, wherein the bankcard reader is compliant with ISO/IEC 14443.

5. The bankcard terminal of claim 1, wherein the bankcard reader is compliant with MasterCard® PayPass™.

6. The bankcard terminal of claim 1, wherein the set of bankcard records comprises a white list of bankcards each eligible for granting access to the transit system.

7. The bankcard terminal of claim 1, wherein:
the bankcard data comprises a bankcard number; and
the determined identifier of the currently presented bankcard is based on a hash computation that incorporates at least part of the bankcard number.

8. The bankcard terminal of claim 7, wherein:
the bankcard data further comprises a name of a card holder; and
the hash computation further incorporates at least part of the name of the cardholder.

9. The bankcard terminal of claim 7, wherein:
the bankcard data further comprises an expiration date; and
the hash computation further incorporates at least part of the expiration date.

10. The bankcard terminal of claim 1, wherein the access controller comprises a gate.

11. The bankcard terminal of claim 1, wherein the access controller comprises a visual indicator.

12. The bankcard terminal of claim 1, wherein the access controller comprises at least one of audio feedback circuitry and visual feedback circuitry.

13. The bankcard terminal of claim 1, further comprising a third interface, coupled to the processor, to communicate with a bankcard verification system.

14. A method for validating entry into a first transit system using a bankcard terminal, the method comprising:
downloading, from a processing system associated with a set of transit systems including the first transit system, a set of bankcard records comprising, for each bankcard record in the set, an identifier of a bankcard previously registered with the processing system, and wherein the set of bankcard records identifies bankcards from a plurality of issuers;
receiving, from a bankcard reader, bankcard data comprising data from a bankcard currently presented by a holder of the bankcard, wherein the bankcard comprises one of a credit card and a debit card;
determining an identifier based on at least part of the bankcard data from the currently presented bankcard;
determining whether the currently presented bankcard is contained in the set of bankcard records;
verifying the currently presented bankcard with a bankcard verification system, if the bankcard was not contained in the set of bankcard records; and
denying access, if the act of verifying the currently presented bankcard with the bankcard verification system results in a determination of an invalid bankcard.

15. The method of claim 14, wherein:
the bankcard data comprises a bankcard identifier number; and
the act of determining the identifier of the currently presented bankcard comprises generating a hash identifier based on at least part of the bankcard identifier number.

16. The method of claim 15, wherein:
the bankcard data further comprises a name of a cardholder; and
the act of generating the hash identifier further comprises generating the hash identifier based on at least part of the name of the cardholder.

17. The method of claim 15, wherein:
the bankcard data further comprises an expiration date; and
the act of generating the hash identifier further comprises generating the hash identifier based on the expiration date.

18. The method of claim 14, wherein the act of determining whether the currently presented bankcard is contained in the set of bankcard records comprises using the determined identifier as a parameter in a lookup function.

19. The method of claim 14, wherein at least one of the bankcards previously presented comprises a presentation by the respective holder through a web interface.

20. The method of claim 14, wherein at least one of the bankcards previously presented comprises a presentation by the respective holder through a bankcard terminal.

21. The method of claim 14, wherein at least one of the bankcards previously presented comprises a presentation by the respective holder through an interactive telephone system.

22. The method of claim 14, wherein at least one of the bankcards previously presented comprises a presentation by the respective holder through a request from a financial institution.

23. The method of claim 14, wherein at least one of the bankcards previously presented comprises a presentation by the respective holder through a bankcard reader at a transit system from the set of transit systems.

24. The method of claim 14, wherein the act of verifying the currently presented bankcard with the bankcard verification system comprises verifying the currently presented bankcard with a clearing and settlement network.

25. The method of claim 14, wherein the act of verifying the currently presented bankcard with the bankcard verification system comprises receiving an authorization, from a clearing and settlement network, for an amount of funds from an account linked to the currently presented bankcard.

26. The method of claim 14, further comprising updating the set of bankcard records with the determined identifier to show the bankcard as a known valid bankcard, if the act of verifying the bankcard results in a determination of a valid bankcard.

27. The method of claim 14, wherein the act of determining the identifier of the currently presented bankcard comprises generating a cryptographic hash.

28. The method of claim 14, further comprising allowing access if the bankcard is a known valid bankcard.

29. The method of claim 14, the method further comprising uploading, to the processing system, updates to the set of bankcard records.

30. The method of claim 14, the method further comprising:
- downloading, from the processing system, updates to the set of bankcard records; and
- incorporating the updates to the set of bankcard records into the set of bankcard records.

31. The method of claim 14, wherein the act of verifying the currently presented bankcard with the bankcard verification system results in a failed attempt.

32. The method of claim 14, wherein the act of verifying the currently presented bankcard with the bankcard verification system comprises receiving, from the bankcard verification system, an indication that the bankcard verification system rejects authorized of a financial charge.

33. A computer-readable medium, comprising machine readable code for performing the acts of:
- downloading, from a processing system associated with a set of transit systems including the first transit system, a set of bankcard records comprising, for each bankcard record in the set, an identifier of a bankcard previously registered with the processing system, and wherein the set of bankcard records identifies bankcards from a plurality of issuers;
- receiving, from a bankcard reader, bankcard data comprising data from a bankcard currently presented by a holder of the bankcard;
- receiving, from a bankcard reader, bankcard data comprising data from a bankcard currently presented by a holder of the bankcard, wherein the bankcard comprises one of a credit card and a debit card;
- determining an identifier based on at least part of the bankcard data from the currently presented bankcard;
- verifying the currently presented bankcard with a bankcard verification system, if the bankcard was not contained in the set of bankcard records; and
- denying access, if the act of verifying the currently presented bankcard with the bankcard verification system results in a determination of an invalid bankcard.

34. A method for validating entry, into a first transit system, using a bankcard terminal, the method comprising:
- downloading, from a processing system associated with a set of transit systems including the first transit system, a set of bankcard records comprising, for each bankcard record, an identifier of a bankcard previously registered with the processing system, and wherein the set of bankcard records identifies bankcards from a plurality of issuers;
- receiving, from a bankcard reader, bankcard data comprising data from a bankcard currently presented by a holder of the bankcard, wherein the bankcard comprises one of a credit card and a debit card;
- determining an identifier based on at least part of the bankcard data from the currently presented bankcard;
- determining whether the currently presented bankcard is contained in the set of bankcard records;
- denying access, if the currently presented bankcard is not contained in the set of bankcard records; and
- uploading, to the processing system, at least one bankcard identifier granted access to the first transit systems.

35. The method of claim 34, further comprising sorting the received data into a data structure.

36. The method of claim 35, wherein the act of sorting the received data into a data structure comprises storing each of the set of bankcard records based on at least part of the identifier of the bankcard previously registered with the processing system.

37. The method of claim 34, wherein:
the bankcard data comprises a bankcard number; and
the act of determining the identifier of the currently presented bankcard comprises generating a hash identifier based on at least part on the identifier of the bankcard previously registered with the processing system.

38. The method of claim 37, wherein:
the bankcard data further comprises a name of a cardholder; and
the act of generating the hash identifier further comprises generating the hash identifier further based on based on at least part on a name of the bankcard holder of the bankcard previously registered with the processing system.

39. The method of claim 37, wherein:
the bankcard data further comprises an expiration date; and
the act of generating the hash identifier further comprises generating the hash identifier further based at least in part on the expiration date of the bankcard previously registered with the processing system.

40. The method of claim 34, wherein the act of determining whether the currently presented bankcard is contained in the set of bankcard records comprises using the determined identifier as a parameter in a lookup function.

41. The method of claim 34, wherein at least one of the bankcards previously presented comprises a presentation by the respective holder through a web interface.

42. The method of claim 34, wherein at least one of the bankcards previously presented comprises a presentation by the respective holder through a bankcard terminal.

43. The method of claim 34, wherein at least one of the bankcards previously presented comprises a presentation by the respective holder through an interactive telephone system.

44. The method of claim 34, wherein at least one of the bankcards previously presented comprises a presentation by the respective holder through a request from a financial institution.

45. The method of claim 34, wherein at least one of the bankcards previously presented comprises a presentation by the respective holder through a bankcard reader at a transit system from the set of transit systems.

46. The method of claim 34, wherein the act of determining the identifier of the currently presented bankcard comprises generating a cryptographic hash.

47. The method of claim 34, the method further comprising:
- downloading, from the processing system, updates to the set of bankcard records; and
- incorporating the updates to the set of bankcard records into the set of bankcard records.

48. A computer-readable medium, comprising machine readable code for performing the acts of:
- downloading, from a processing system associated with a set of transit systems including the first transit system, a set of bankcard records comprising, for each bankcard record, an identifier of a bankcard previously registered with the processing system, and wherein the set of bankcard records identifies bankcards from a plurality of issuers;
- receiving, from a bankcard reader, bankcard data comprising data from a bankcard currently presented by a holder of the bankcard, wherein the bankcard comprises one of a credit card and a debit card;
- determining an identifier based on at least part of the bankcard data from the currently presented bankcard;
- determining whether the currently presented bankcard is contained in the set of bankcard records;

denying access, if the currently presented bankcard is not contained in the set of bankcard records; and uploading, to the processing system, at least one bankcard identifier granted access to the first transit systems.

49. A processing system associated with a set of transit systems including at least one transit system, the processing system comprising:

a first interface to communicate with at least one bankcard terminal;

a processor coupled to the first interface;

memory, coupled to the processor, to hold a set of bankcard records comprising, for each bankcard record in the set, an identifier of a bankcard previously presented, by a respective holder of the bankcard, to a registration system, wherein the bankcard comprises one of a credit card and a debit card, wherein the identifier is based on at least part of bankcard data from the bankcard, and wherein the set of bankcard records identifies bankcards from a plurality of issuers;

a second interface, coupled to the processor, to communicate with a bankcard verification system; and a third interface, coupled to the processor, to communicate with a bankcard registration system.

50. The processing system of claim 49, wherein the set of bankcard records comprises a subset of bankcard records each comprising an indication as being eligible for a future purchase at a bankcard terminal.

51. The processing system of claim 49, wherein the bankcards are compliant with ISO/IEC 14443.

52. The bankcard terminal of claim 49, wherein the bankcard reader is compliant with MasterCard® PayPass™.

53. The processing system of claim 49, wherein the verification system comprises an interface to communicate with respective acquirers of the one transit system.

54. The processing system of claim 49, wherein the verification system comprises an interface to communicate with an issuer of the presented bankcard.

55. The processing system of claim 49, wherein the registration system comprises a website.

56. The processing system of claim 49, wherein the registration system comprises an interactive kiosk at a transit system.

57. The processing system of claim 49, wherein the registration system comprises an interface to an issuer's back office systems.

58. A method for maintaining a set of bankcard records at a processing system associated with a set of transit systems including at least one transit system, the method comprising:

receiving, from a bankcard registration system, a registration request containing bankcard data of a bankcard presented by a respective holder of the bankcard, wherein the bankcard comprises one of a credit card and a debit card;

determining an identifier based on at least part of the bankcard data from the presented bankcard;

determining whether the presented bankcard is contained in a set of bankcard records comprising, for each bankcard record in the set, an identifier of a bankcard previously presented to the processing system, and wherein the set of bankcard records identifies bankcards from a plurality of issuers;

verifying, with a bankcard verification system, eligibility of the presented bankcard for a future purchase; and downloading, to at least one bankcard terminal, the set of bankcard records.

59. The method of claim 58, further comprising incorporating the presented bankcard into the set of bankcard records, if the act of verifying the presented bankcard with the bankcard verification system results in receiving an indication of a valid bankcard.

60. The method of claim 58, further comprising downloading, to at least one bankcard terminal, updates to the set of bankcard records.

61. The method of claim 58, further comprising reporting a failure, if the act of verifying the presented bankcard results in a determination of an invalid bankcard.

62. The method of claim 58, further comprising removing, from the set of bankcard records, the present bankcard, if the act of verifying the presented bankcard results in the determination of an invalid bankcard.

63. The method of claim 58, wherein the act of verifying the currently presented bankcard with the bankcard verification system comprises verifying the currently presented bankcard with a clearing and settlement network.

64. The method of claim 58, wherein the act of verifying the currently presented bankcard with the bankcard verification system comprises receiving an authorization, from a clearing and settlement network, for an amount of funds from an account linked to the currently presented bankcard.

65. The method of claim 58, wherein the act of verifying the currently presented bankcard with the bankcard verification system results in a failed attempt.

66. The method of claim 58, wherein the act of verifying the currently presented bankcard with the bankcard verification system comprises receiving, from the bankcard verification system, an indication that the bankcard verification system rejects authorized of a financial charge.

67. A computer-readable medium, comprising machine readable code for performing the acts of:

receiving, from a bankcard registration system, a registration request containing bankcard data of a bankcard presented by a respective holder of the bankcard wherein the bankcard comprises one of a credit card and a debit card;

determining an identifier based on at least part of the bankcard data from the presented bankcard;

determining whether the presented bankcard is contained in a set of bankcard records comprising, for each bankcard record in the set, an identifier of a bankcard previously presented to the processing system, and wherein the set of bankcard records identifies bankcards from a plurality of issuers;

verifying, with a bankcard verification system, eligibility of the presented bankcard for a future purchase; and downloading, to at least one bankcard terminal, the set of bankcard records.

68. The method of claim 14, further comprising uploading, to the processing system, at least one bankcard identifier granted access to the first transit systems.

* * * * *